(12) United States Patent
Yakimenko

(10) Patent No.: US 11,281,905 B2
(45) Date of Patent: Mar. 22, 2022

(54) SYSTEM AND METHOD FOR UNMANNED AERIAL VEHICLE (UAV)-BASED FOREIGN OBJECT DEBRIS (FOD) DETECTION

(71) Applicant: THE UNITED STATES OF AMERICA, AS REPRESENTED BY THE SECRETARY OF THE NAVY, Arlington, VA (US)

(72) Inventor: Oleg A. Yakimenko, Seaside, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 182 days.

(21) Appl. No.: 16/568,462

(22) Filed: Sep. 12, 2019

(65) Prior Publication Data
US 2020/0097721 A1    Mar. 26, 2020

Related U.S. Application Data

(60) Provisional application No. 62/736,302, filed on Sep. 25, 2018.

(51) Int. Cl.
*G06K 9/00* (2006.01)
*G06K 9/32* (2006.01)
(Continued)

(52) U.S. Cl.
CPC ........ *G06K 9/00637* (2013.01); *B64C 39/024* (2013.01); *G05D 1/0027* (2013.01);
(Continued)

(58) Field of Classification Search
CPC ............. G06K 9/00637; G06K 9/3233; G06K 9/3241; B64C 39/024; B64C 2201/127;
(Continued)

(56) References Cited

U.S. PATENT DOCUMENTS

| 2013/0279750 | A1* | 10/2013 | Zhou | G06T 7/001 |
| | | | | 382/103 |
| 2016/0033966 | A1* | 2/2016 | Farris | A47G 29/141 |
| | | | | 701/15 |

FOREIGN PATENT DOCUMENTS

WO    2016019242 A1    2/2016

OTHER PUBLICATIONS

Yakimenko, Oleg and Lee, Wee-Leong. "Feasibility Assessment of sUAS-based Automated FOD Detection System." 2018 International Conference on Control and Robots (ICCR), IEEE pp. 89-97.
(Continued)

*Primary Examiner* — Brenda C Bernardi
(74) *Attorney, Agent, or Firm* — Naval Postgraduate School; Scott Bell

(57) ABSTRACT

A computer-based system and method allows a user to automatically aerially inspect a selected runway/taxiway/tarmac surface for foreign object debris (FOD) using a plurality of UAVs equipped with electro-optical (EO) sensors. Live images of the runway surface captured by the EO sensors are transmitted from the UAVs during an inspection sweep of the runway surface and are compared with FOD-free reference images of the runway surface to determine whether candidate FOD are detected on the runway surface. Information about and images of candidate FOD are displayed to the user allowing the user to determine whether to send a team to remove the FOD from the runway.

15 Claims, 13 Drawing Sheets
(6 of 13 Drawing Sheet(s) Filed in Color)

(51) Int. Cl.
  *G06T 7/33* (2017.01)
  *G06T 7/00* (2017.01)
  *G05D 1/00* (2006.01)
  *G05D 1/04* (2006.01)
  *B64C 39/02* (2006.01)

(52) U.S. Cl.
  CPC ........... *G05D 1/042* (2013.01); *G06K 9/3233* (2013.01); *G06T 7/0002* (2013.01); *G06T 7/337* (2017.01); *G06T 7/97* (2017.01); *B64C 2201/127* (2013.01); *G06T 2210/12* (2013.01)

(58) Field of Classification Search
  CPC ...... G05D 1/104; G05D 1/0094; G05D 1/042; G05D 1/0027; G06T 7/0002; G06T 7/337; G06T 7/97; G06T 2210/12; G06T 2207/10032
  See application file for complete search history.

(56) References Cited

OTHER PUBLICATIONS

Lee, Wee Leong, "Assessment of Foreign Object Debris Management Using Group 1 Unmanned Aerial Systems." Thesis, Naval Postgraduate School, 2018.
U.S. Department of Transportation, "Airport Foreign Object Debris (FOD) Management." Advisory Circular (AC), AC No. 150/5210-24, Sep. 30, 2010.

\* cited by examiner

US 11,281,905 B2

SYSTEM AND METHOD FOR UNMANNED AERIAL VEHICLE (UAV)-BASED FOREIGN OBJECT DEBRIS (FOD) DETECTION

CROSS-REFERENCE TO RELATED APPLICATIONS

This application claims the benefit of U.S. Provisional Application No. 62/736,302, filed Sep. 25, 2018, which is hereby incorporated in its entirety by reference.

BACKGROUND OF THE INVENTION

1. Field of the Invention

The present invention relates generally to foreign object debris detection on airport runways.

2. Description of the Related Art

Aircraft can occasionally lose parts during takeoff from and landing on an airport runway. These parts remain on the runway and can cause damage to tires of other aircraft, hit the fuselage or windshield/canopy, or get sucked up into an engine. This debris is commonly termed foreign object debris (FOD). The U.S. Federal Aviation Administration (FAA) defines FOD as "any object, live or not, located in an inappropriate location in the airport environment that has the capacity to injure airport or air carrier personnel and damage aircraft" (FAA AC No: 150/5210-24).

The presence of FOD is a continuing concern at airports worldwide. FOD damage costs airlines, airports, and airport tenants millions of dollars every year, and in some cases has resulted in the loss of life of hundreds of lives. Thus, airports place a large emphasis on detection and removal of FOD from runways.

SUMMARY OF THE INVENTION

Embodiments in accordance with the invention, allow a user to aerially inspect a selected runway surface for foreign object debris (FOD) using a plurality of unmanned aerial vehicles (UAVs) equipped with electro-optical (EO) sensors. The plurality of UAVs conduct an aerial inspection sweep of the selected runway surface in accordance with user defined sweep parameters. Live images of the runway surface taken by the EO sensors and received from the UAVs during the aerial inspection sweep are compared with corresponding FOD-free reference images of the runway surface to determine whether candidate FOD are detected on the runway surface. Identifying information and images of candidate FOD are displayed to the user allowing the user to determine whether to send a team to remove the FOD from the runway. In some embodiments, the user can direct one or more of the UAVs to perform further inspection of the candidate FOD to aid in determining whether to send a team to remove the FOD. In some embodiments, the candidate FOD detections are automatically sent to a FOD removal team.

In accordance with one embodiment, a system for UAV-based FOD detection is described. In accordance with another embodiment, a method for UAV-based FOD detection is described.

Embodiments in accordance with the invention are best understood by reference to the following detailed description when read in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments in accordance with the invention are further described herein with reference to the drawings.

DETAILED DESCRIPTION OF THE INVENTION

Figure 1:
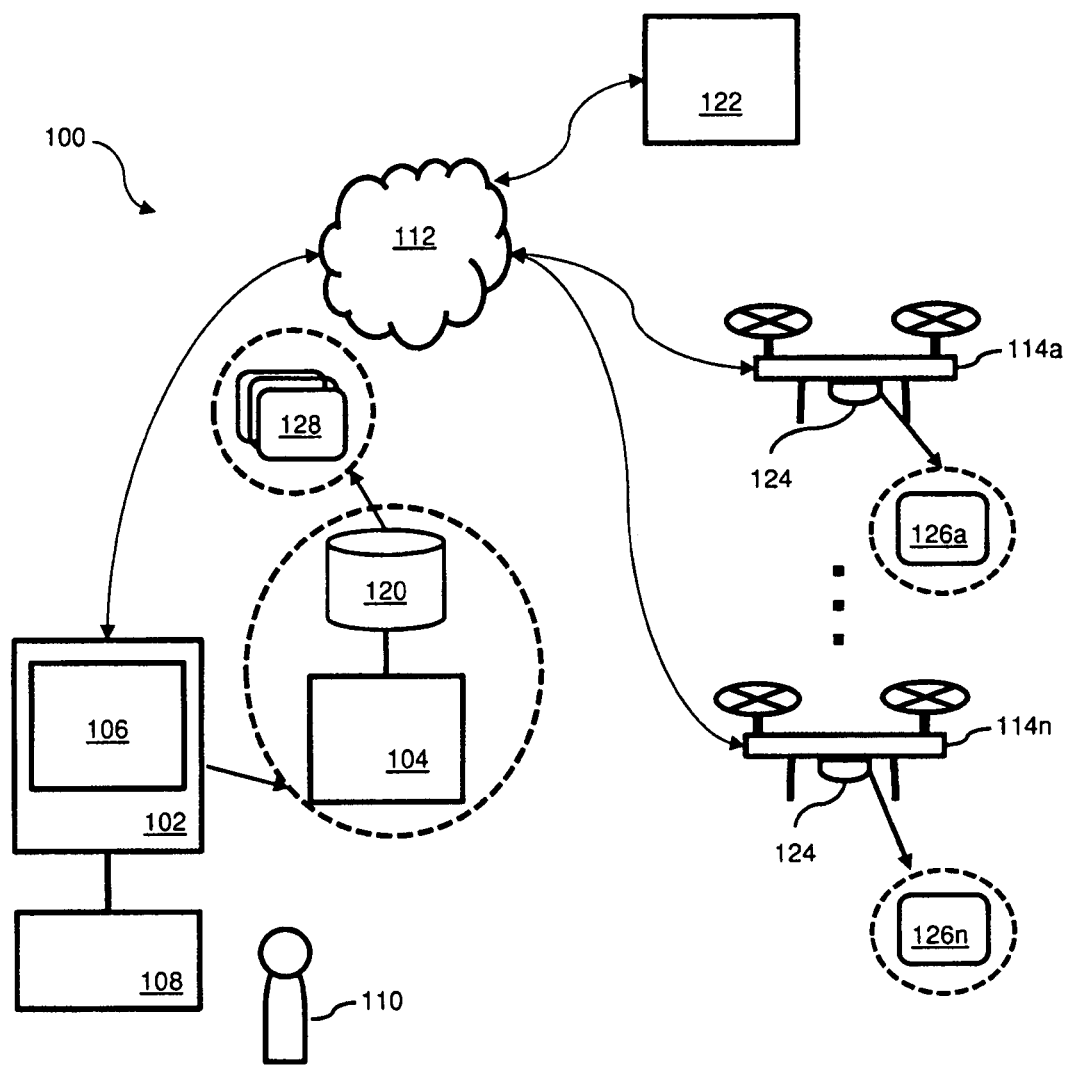
FIG. 1 is an illustration of a UAV-based FOD detection system in accordance with one embodiment of the invention.
Figure 1:
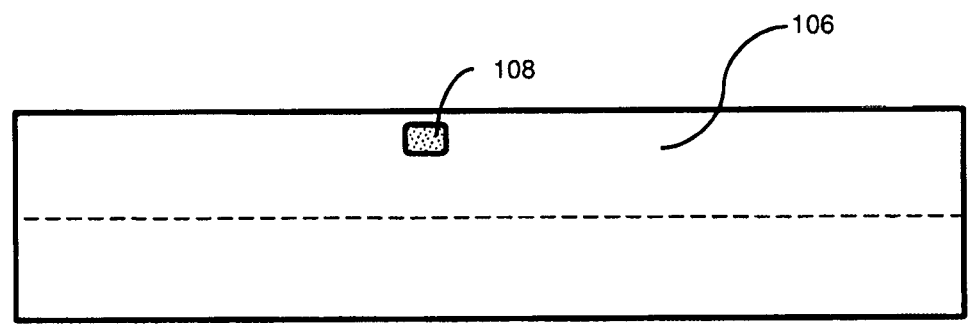

FIG. 1 illustrates a high level architecture of a UAV-based foreign object debris (FOD) detection system 100, herein also referred to as system 100, in accordance with one embodiment of the invention. In the present embodiment, system 100 includes: a computer system 102 having a user input device 108 and a display screen 106; a UAV-based FOD detection method 104, herein referred to as method 104, executing on computer system 102; a FOD-free reference image library 120, herein referred to as library 120, accessible by method 104; one or more unmanned aerial vehicles (UAVs) 114, shown as UAVs 114a through 114n, each having an electro-optical sensor 124; and a wireless network 112, such as the Internet, an intranet, or other network, communicatively coupling method 104 via computer system 102, and UAVs 114. In the present embodiment, other systems, such as an airport information system 122, are accessible by method 104 via network 112 to obtain airport related information, such as wind conditions.

Generally viewed, system 100 allows a user 110 to conduct an aerial inspection sweep a selected airport runway 116 surface for FOD, such as FOD 118, using a plurality of UAVs 114. User 110 inputs the parameters of the inspection sweep onto computer system 102, for example, using input device 108, via one or more graphical user interfaces (GUIs) displayed to user 110 on display 106. During the sweep of selected runway 116 surface, UAVs 114 aerially traverse above the surface of runway 116, for example, in a line formation, and transmit live video images 126 of the surface of runway 116 captured by EO sensors 124 over network 112 to computer system 102. Method 104 receives live video images 126 and compares live video images 126 against corresponding FOD-free reference images 128 of the surface of runway 116 stored in library 120 and determines whether candidate FOD are detected on the surface of runway 116. When candidate FOD is detected, information identifying each candidate FOD is displayed to user 110 via the one or more GUIs. User 110 can then send a team to remove FOD 118 from runway 116. Optionally, user 110 can request a closer inspection of FOD 118. User 110 can send one or more UAVs 114 out of the formation of UAVs 114 to provide further live video images of FOD 118, and then return them to the formation of UAVs 114. As a further option, user 110 can send the entire formation of UAVs 114 back to repeat the inspection sweep. User 110 can then send a team to remove FOD 118 if so desired. In some embodiments, system 100 can automatically send the identified candidate FOD to a removal team. In this way, FOD detection of a runway surface is performed by system 100 with identification of potential hazards to user 110.

In the present embodiment, UAVs 114 can be any of a variety of UAVs capable of aerially transiting above the surface of runway 116 and providing live images of the runway surface from an EO sensor 124. An example of a UAV with an EO sensor is the Inspire 1 with Zenmuse X3 camera, available from DJI, Shenzhen, China. UAVs 114 include conventional systems that allow each UAV 114 to be controlled remotely by system 100, to communicate UAV 114 related information, such a UAV location and altitude, to network 112, and to transmit live video images captured by EO sensors 124.

UAVs 114 can be located and operated from a fixed location, herein termed a UAV base. For example, a UAV base could be near an airport. UAVs 114 are programmed to depart from the UAV base, travel a fixed and safe route to the end of the selected runway, or to the beginning of a specific area, to include ramps and taxiways, to be aerially inspected for FOD.

In the present embodiment, library 120 was initially created by having UAVs, such as UAVs 114, traverse the entire length of a FOD-free selected runway surface, to include ramps and taxiways, at a constant altitude above ground level (AGL) and take still images by EO sensors 124. The still images were then preprocessed and stored in library 120 as FOD-free reference images 128. In one embodiment, images 128 are stored with information identifying the location of the image with reference to the start of the selected runway. As can be readily understood by those of skill in the art, the number of UAVs 114 required to implement the imaging of the runway is dependent on the runway's width and the characteristics of the specific EO sensor 124 utilized on UAV 114s together with the search altitude.

FIG. 2, shown in partial views in FIGS. 2A, 2B, 2C and 2D, is a process flow diagram of a method 104 for UAV-based FOD detection in accordance with one embodiment of the invention. In the present example, method 104 is embodied as a computer application executing on computer system 102. At the start of method 104, library 120 has been preloaded with FOD-free reference images 128 of runways selectable by a user and is accessible by method 104.

Figure 2A:
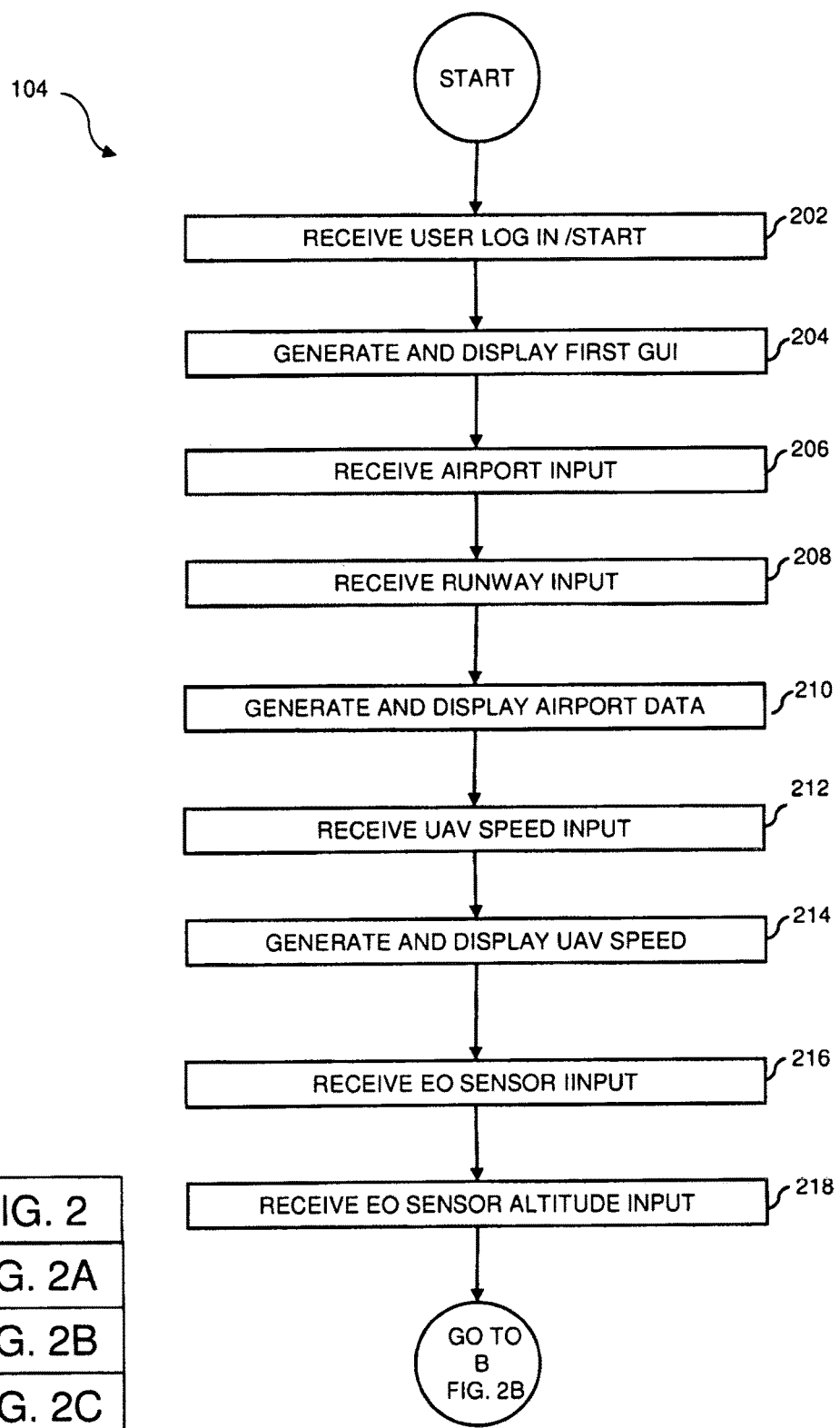
FIG. 2, shown in partial views in FIGS. 2A, 2B, 2C and 2D, is a process flow diagram of a UAV-based FOD detection method in accordance with one embodiment of the invention.

Referring initially to FIG. 2A, in operation 202, a user input to initiate method 104 is received. For example, user 110 can log onto computer system 102 via input device 108 and select the start of method 104.

In operation 204, method 104 generates and displays a first graphical user interface (GUI) on display 106 as described further herein with reference to FIGS. 3A-3D.

Figure 3A:
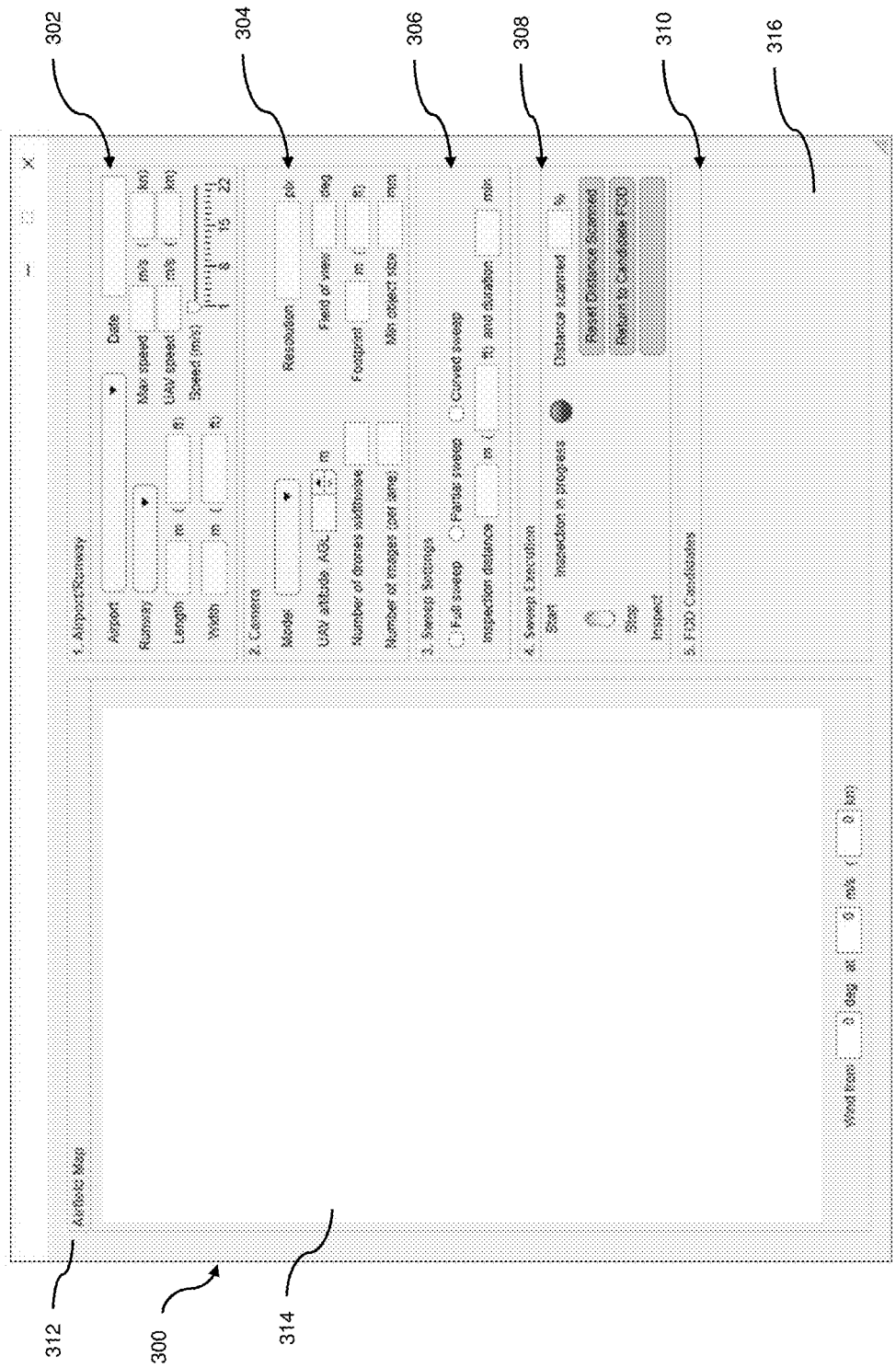
FIG. 3A is a screen shot of a first graphical user interface (GUI) prior to start of an example UAV-based FOD inspection sweep in accordance with one embodiment of the invention.

FIG. 3A shows an example of first GUI 300 in accordance with one embodiment of the invention. In the present example, the GUI prototyping was accomplished in the MATLAB development environment using the App Designer tool described in "Engineering Computations and Modeling in MATLAB®/SIMULINK®," by O. Yakimenko, American Institute of Aeronautics and Astronautics, Reston, Va. 2011.

As illustrated, first GUI 300 includes six panels: a first panel 302, a second panel 304, a third panel 306, a fourth panel 308, a fifth panel 310, and a sixth panel 312.

First panel 302, labeled as "1. Airport/Runway," allows a user to manipulate a dropdown menu to select an airport and a specific runway for inspection. The corresponding values of the chosen runway's length and width are then displayed in corresponding fields within first panel 302. First panel 302 includes a speed selection bar that a user can move to adjust the speed of UAVs 114. As the speed selection bar is moved, data for maximum speed of the UAVs 114, "Max speed," and selected speed of the UAVs 114, "UAV speed," are displayed in corresponding fields both in meters/second (m/s) and knots (kn) in first panel 302. A date of the runway inspection can be included in first panel 302, for example, in a "Date" field. The date can be user input or automatically generated and displayed by method 104.

Second panel 304, labeled as "2. Camera," allows a user to select the UAV electro-optical (EO) sensor and an above ground level (AGL) altitude. For example, a user can select the EO sensor from a "Model" dropdown menu and select an altitude in meters by selecting up or down arrows in a "UAV altitude, AGL" field. The selected EO sensor specifications, such as resolution and field of view (FoV), together with the selected UAV altitude of flight, define the minimum FOD size that can be detected along with the number of UAVs 114 required to perform the inspection of the specific runway widthwise. After selection of the EO sensor model and UAV altitude, the number of UAVs 114 required to scan the selected runway is displayed in a "Number of drones widthwise" field, and a number of images per UAV 114 is displayed in a "Number of images (per lane)" field. Additionally, the still image resolution is displayed in a "Resolution" field in pixels (pix), a field of view is displayed in a "Field of view" field in degrees (deg), a UAV ground footprint is displayed in a "Footprint" field, in meters (m) and in feet (ft), a minimum detectable size of a FOD object is displayed in a "Min object size" field in millimeters (mm), and the approximate number of still images per single UAV 114 lengthwise is displayed.

Third panel 306, labeled as "3. Sweep Settings," allows a user to select a UAV sweep pattern. A sweep pattern is the path UAVs 114 will aerially traverse over the runway to inspect the runway for FOD. For example, a user can select between a full sweep, a partial sweep, and a curved sweep by clicking on a "Full sweep" button, a "Partial sweep" button, or a "Curved sweep" button. A full sweep corresponds to an inspection of the entire runway end-to-end. A partial sweep corresponds to an inspection of only a specific portion of the selected runway. A curved sweep corresponds to a simultaneous inspection of multiple areas of the selected runway and allows a user to specify UAV turn points between the areas to set a sweep route. In both the partial sweep and curved sweep, crosshairs will be displayed on an airport diagram displayed in sixth panel 312 allowing the user to select the start points and end points of the sweep pattern for FOD inspection. When a curved sweep is selected, additional UAV turning points can be displayed selected by the user.

Once the area to be inspected is selected, the inspection distance and sweep time are determined and displayed in third panel 306. For example, "Inspection distance" fields in meters (m) and feet (ft) will display the inspection path length, and a "duration" field will display the estimated time in minutes (min) to conduct the sweep mission based on the chosen speed and wind conditions.

Fourth panel 308, labeled as "4. Sweep Execution," allows a user to then start execution of the defined inspection sweep. Fourth panel 308 includes a toggle switch that allows a user to select a "Stop" setting or a "Start" setting. Input of the "Start" selection starts execution of the defined mission with method 104 sending commands to UAVs 114 to begin inspection of the runway in accordance with the user selected settings. Fourth panel 308 includes an "Inspection in progress" indicator which displays a red color, indicating a mission not in progress or stopped, or a green color, indicating a mission in progress. A "Distance scanned" field displays a percentage of the selected sweep path inspected. In the present embodiment, during the inspection, the user can stop and resume the sweep process by selecting a change in the toggle switch from "Start" to "Stop" and from "Stop" to "Start," respectively. Fourth panel 308 further includes a "Reset Distance Scanned" button that allows the user to restart the selected sweep pattern, in which UAVs 114 return to the initial sweep position on the runway and restart the selected sweep pattern. Fourth panel 308 also includes a "Return to Candidate FOD" button that allows the user to return a UAV 114 to a candidate FOD to have a closer inspection, such as at a different angle(s) and/or lower altitude.

Fifth panel 310, labeled as "5. FOD Candidates," allows a user to view information corresponding to candidate FOD detected during the specified sweep. Fifth panel 310 includes FOD field 316 that is populated with information corresponding to each candidate FOD detected during the sweep. In the present example, candidate FOD information included in FOD field 316 for each candidate FOD includes: a FOD identifier (ID) generated by method 104; the location of the candidate FOD, as latitude and longitude; a size of the candidate FOD; a color of the candidate FOD; and a location of the candidate FOD relative to the start of the sweep.

Sixth panel 312, labeled "Airfield map," includes a panel 314 for display of a selected airport map. Once the airport and runway are selected in first panel 302, an airport diagram is displayed panel 314. In the present example, airport wind related information obtained from an external source 122, such as airport wind information system accessible via network 112, is displayed in sixth panel 312 below panel 314. For example, the wind direction is displayed in a "Wind speed from" field in degrees (deg), and the wind speed is displayed in fields in both meters/second (m/s) and knots (kn).

Figure 3B:
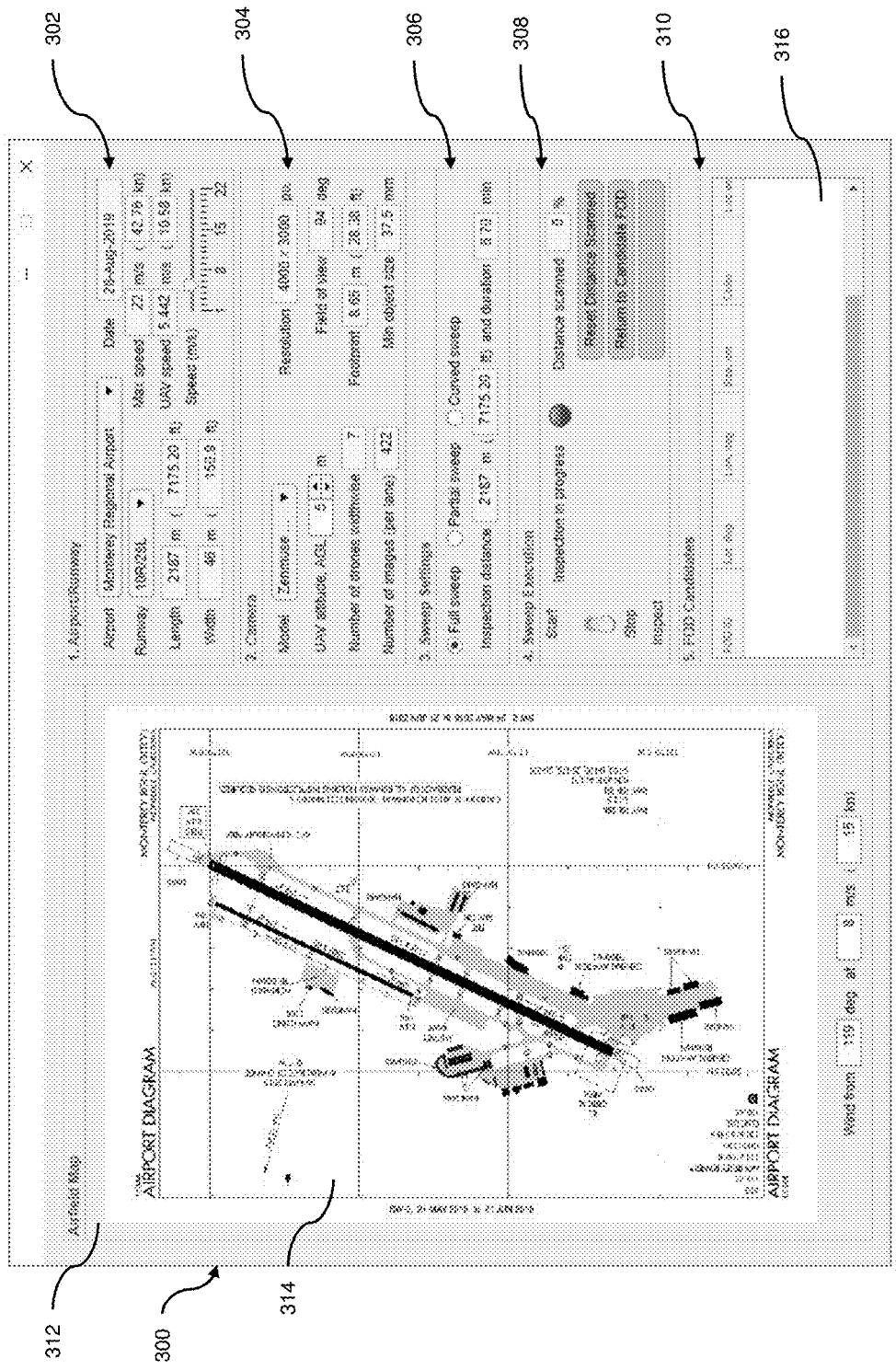
FIG. 3B is a screen shot of the first GUI showing example data entered by a user and data generated by the method of FIG. 2 in accordance with one embodiment of the invention.

Referring now to FIG. 2A and FIG. 3B, in operation 206, user input of a selected airport selected from the drop down menu in the "Airport" field in first panel 302 is received. For example, in FIG. 3B, the Monterey regional airport is selected.

In operation 208, user input of a specific runway from the drop down menu in the "Runway" field in first panel 302 is received. For example, in FIG. 3B, the runway 10R/28L is selected.

In operation 210, based on the user's inputs, method 104 generates and displays airport data in first panel 302 and sixth panel 312. For example, in FIG. 3B, the corresponding values of the selected runway's length and width are displayed in corresponding fields within first panel 302. Additionally, an airport diagram of the selected airport, e.g., the Monterey regional airport, is displayed in panel 314 of sixth panel 312. In the present example, the current corresponding wind direction and speed (m/s and kn) at the selected runway are also displayed below panel 314.

In operation 212, user input of a UAV speed selected in first panel 302 is received. The user can adjust the speed at which UAVs 114 traverse above the runway by moving the speed selection bar in first panel 302.

In operation 214, the values displayed in the "Max speed" and "UAV speed" fields are displayed in first panel 302.

In operation 216, user input of a UAV EO sensor selected from the "Model" dropdown menu in second panel 304 is received.

In operation 218, user input of a UAV altitude selected using the up or down arrows in the "UAV altitude, AGL" field in second panel 304 is received.

Figure 2B:
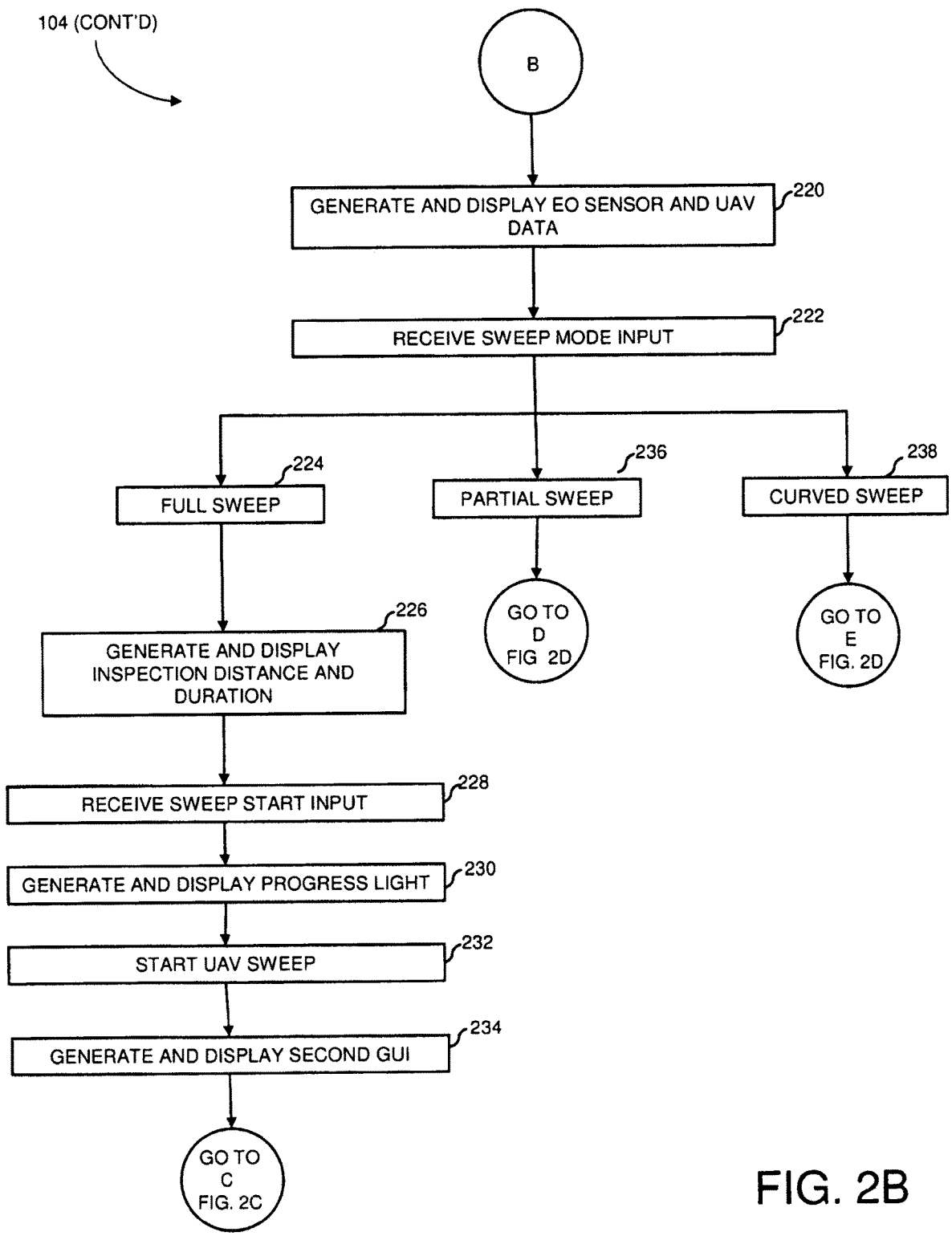

Referring now to FIG. 2B, in operation 220, method 104 generates and displays in second panel 304 information related to the selected EO sensor and the UAVs needed for the inspection sweep. A still image resolution is displayed in the "Resolution" field in pixels (pix), a field of view is displayed in the "Field of view" field in degrees (deg), a UAV ground footprint is displayed in the "Footprint" fields, in meters (m) and in feet (ft), and a minimum detectable size of a FOD object is displayed in the "Min object size" field in millimeters (mm). The resolution and the field of view define the minimum FOD size that can be detected and the number of UAVs 114 required to perform the inspection of the specific runway widthwise. The calculation of a ground food print of an UAV aerial camera is well known to those of skill in the art and not further detailed herein. Method 104 also generates and displays the number of UAVs 114 required to scan the selected runway in the "Number of drones widthwise" field, and the number of images per UAV 114 in the "Number of images (per lane)" field.

In operation 222, user input of a sweep pattern selection entered in third panel 306 is received. In operation 222, the user input can be either selection of a full sweep, a partial sweep or a curved sweep by selecting an associated button in third panel 306 with processing continuing to the selected sweep process as further detailed below.

When input of a full sweep pattern in received, in operation 224, a full sweep pattern process is initiated with processing continuing to operation 226.

In operation 226, method 104 generates and displays the sweep inspection distance and duration in third panel 306.

In operation 228, a user input of a sweep start selection entered in third panel 306 is received. In operation 228, a user can select start of a sweep by changing the toggle switch from "Stop" to "Start" in fourth panel 308.

In operation 230, method 104 generates and displays a progress light, for example a green color light, in fourth panel 308 indicating initiation of the selected sweep pattern.

In operation 232, method 104 sends commands to UAVs 114 to start the selected inspection sweep. For example, method 104 sends commands to UAVs 114 to depart the UAV base, transit to the start of the sweep pattern, and begin aerially traversing the runway to inspect for FOD on the surface of the selected runway, e.g., runway 116.

Figure 4A:
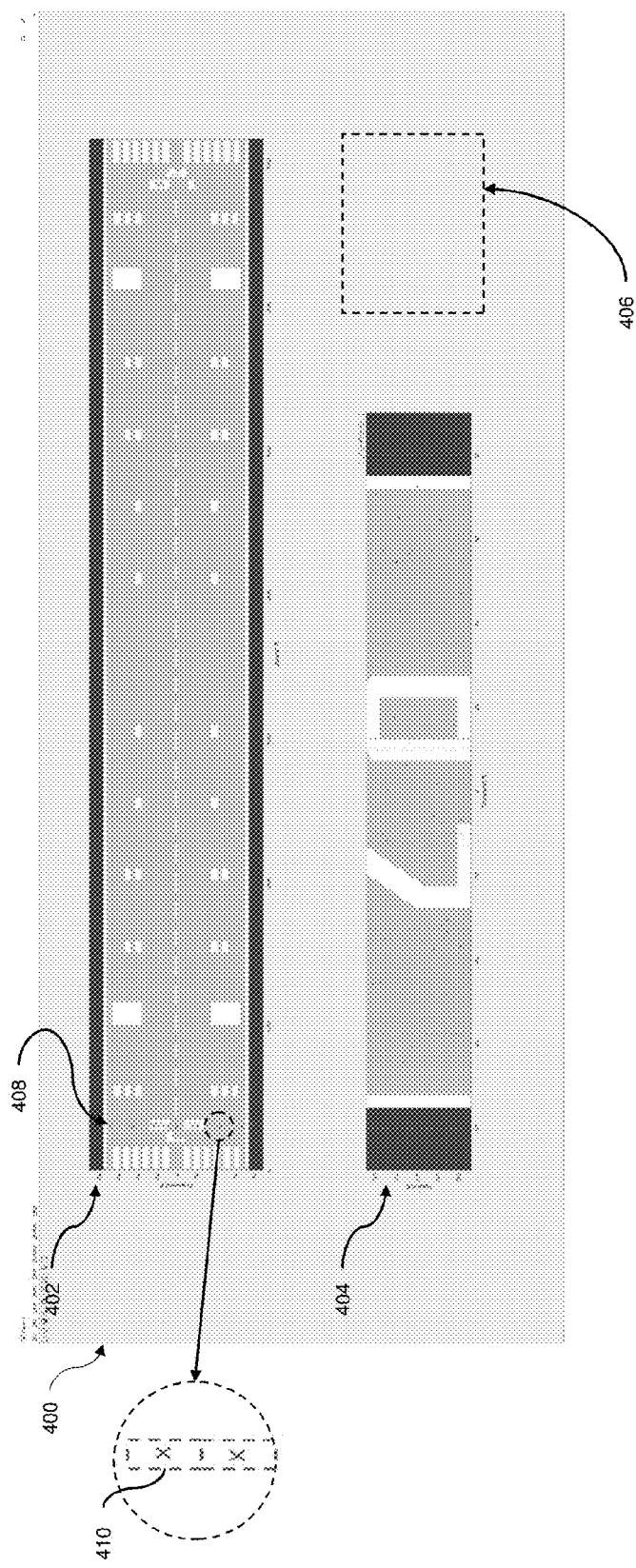
FIG. 4A is a screen shot of a second GUI showing the start of an example UAV-based FOD inspection sweep in accordance with one embodiment of the invention.

Referring now to FIG. 2B, and FIG. 4A, in operation 234, method 104 generates and displays a second GUI 400 in another window. Second GUI 400 allows the user to monitor the sweep progress in real time. As illustrated in FIG. 4A, GUI 400 includes an upper plot 402, a lower plot 404, and a display area 406. Upper plot 402 provides a visualization of the inspection area, a current position 408 of each of UAVs 114 in the inspection area, and a ground footprint 410 of each UAVs 114 EO sensor 124. Lower plot 408 provides a visualization of live imagery from EO sensors 124. Display area 406 allows display of a live image of a candidate FOD detected during the sweep. Candidate FOD can also be displayed in upper plot 402 and lower plot 404.

Figure 2C:
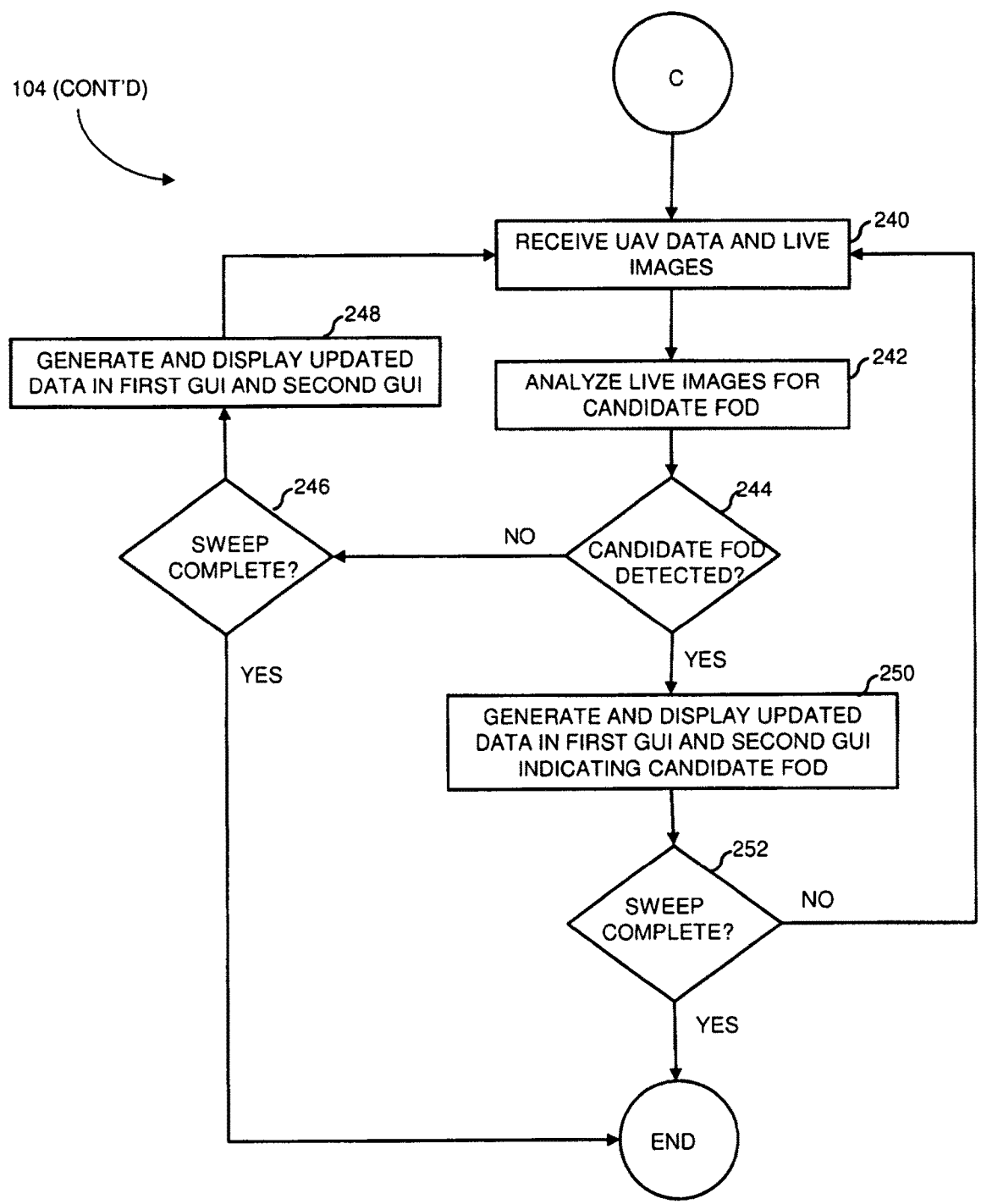

Referring now to FIG. 2C, in operation 240, sweep data from UAVs 114 is received. In particular, method 104 receives location data of UAVs 114 and live images 126 of the selected runway surface, e.g., the surface of runway 116.

In operation 242, live images 126 received from UAVs 114 are analyzed to determine if candidate FOD is detected. In one embodiment, live images 126 received from UAVs 114 are compared to corresponding FOD-free reference images 128 read in from library 120 to determine if candidate FOD is detected. In the present embodiment, candidate FOD detection was accomplished using Image Processing and Computer Vision System toolboxes of MATLAB. These toolboxes provide a variety of the functions for image handling, transformation, filtering and other processes as further described herein with reference to FIG. 5 and method 500.

Figure 5:
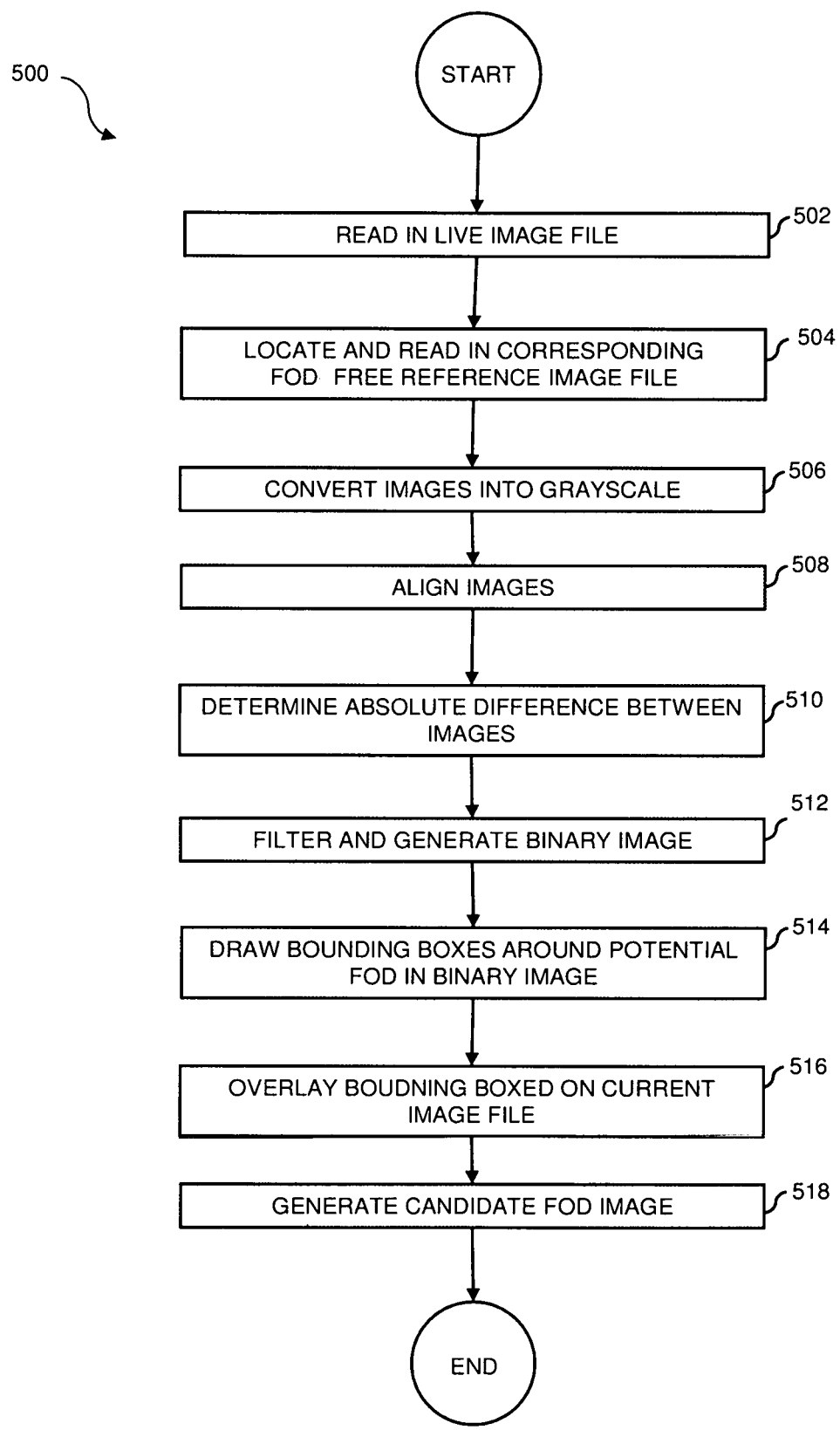
FIG. 5 is a process flow diagram of a method for determining whether a received live image captured by an EO sensor includes a detection of a candidate FOD in accordance with one embodiment of the invention.

FIG. 5 illustrates an example of a method 500 included within method 104 to detect candidate FOD in accordance with one embodiment of the invention. In operation 502, a live image 126 received from a UAV 114, for example, as an image file, is read in. In one embodiment, live image 126 file includes identifying information, such a location on the runway from the start of the runway. In operation 504, a corresponding FOD-free reference image 128 file is located in library 120 and read in. In one example, the FOD-free reference image 128 file includes identifying information allowing it to be identified as corresponding to the live image 1126 file, for example, identifying information, such a location on the runway from the start of the runway. In operation 506, both live image 126 and corresponding FOD-free image 128 are converted into gray scale. In operation 508, live image 126 and FOD-free reference image 128 are aligned. In operation 510, an absolute difference between live image 126 and FOD-free reference image 128 is determined. In operation 512, the aligned images are filtered and a binary image is generated. In operation 514, a bounding box is drawn around each potential FOD indicated in the binary image. In operation 516, each bounding box is overlaid on live image 126 file. In operation 518, a candidate FOD image is generated for each image within a bounding box on live image 126 file, a candidate FOD image indicating determination of candidate FOD.

Referring back now to FIG. 2C, in decision operation 244, a determination is made whether a candidate FOD was detected in operation 242. When a candidate FOD image is not generated in operation 242, this indicates a candidate FOD was not detected, and processing continues to decision operation 246.

In decision operation 246, a determination is made whether the sweep has completed based on data received from UAVs 114, for example, progress is 100%. When the sweep is not complete ("NO"), processing continues to operation 248.

Figure 3C:
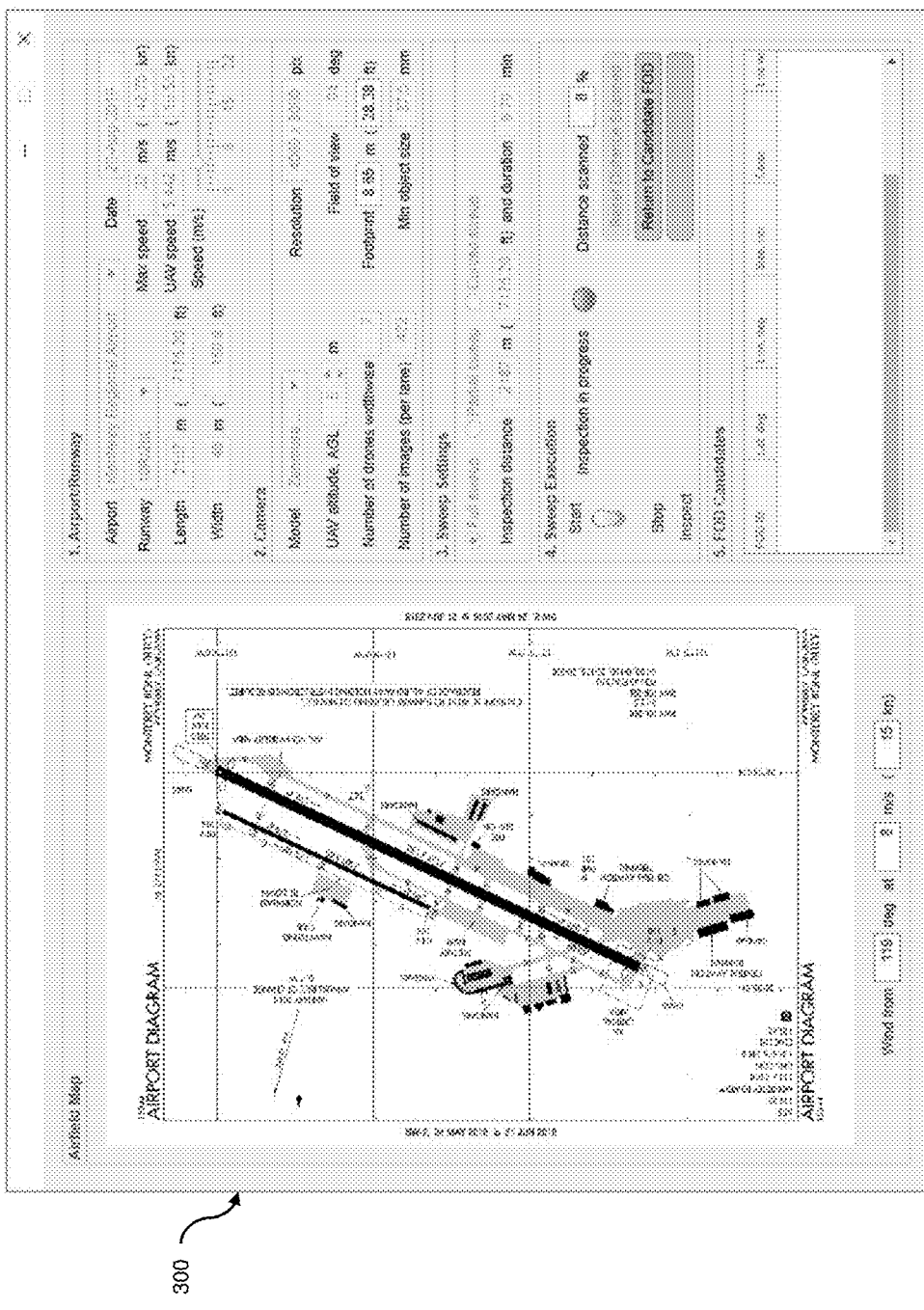
FIG. 3C is a screen shot of the first GUI showing progress of an example UAV-based FOD inspection sweep in accordance with one embodiment of the invention.

In operation 248, method 104 generates and displays updated data in first GUI 300 and second GUI 400, and processing returning to operation 240. FIG. 3C illustrates an example of an updated GUI 300 showing progress of the inspection sweep in fourth panel 312, e.g., distance scanned 8%, with no candidate FOD detected.

Alternatively, in decision operation 246, when the sweep has completed ("YES"), processing stops, with method 104 ending.

Referring now back to decision operation 244, alternatively, when a candidate FOD image is generated in operation 242, this indicates a candidate FOD was detected, and processing continues to operation 250.

Figure 3D:
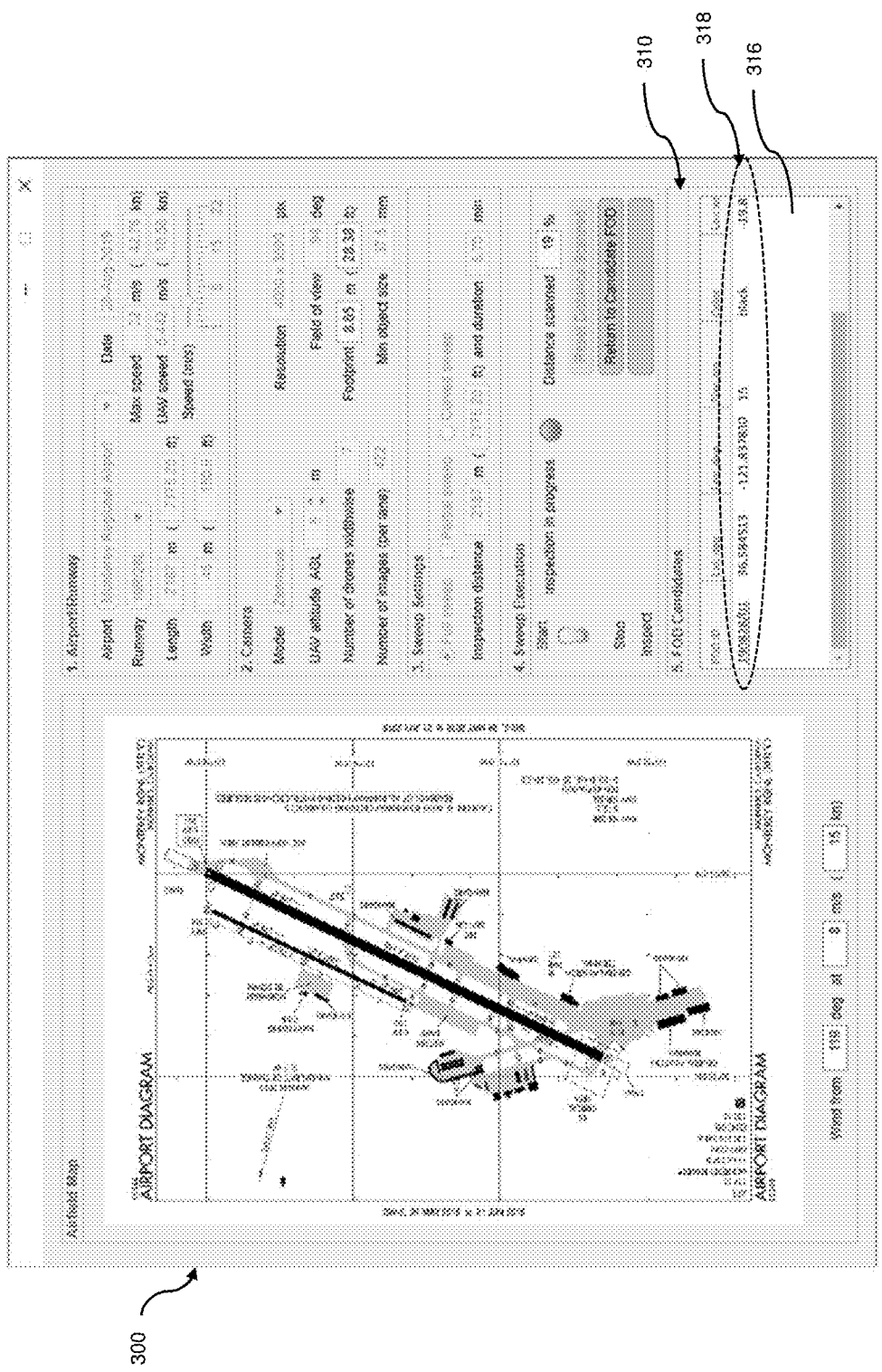
FIG. 3D is a screen shot of the first GUI showing detection of a candidate FOD in accordance with one embodiment of the invention.

In operation 250, method 104 generates and displays updated data in first GUI 300 and second GUI 400 indicating candidate FOD. FIG. 3D illustrates an example where candidate FOD information is displayed in first GUI 300 in accordance with one embodiment of the invention. In the present example, when candidate FOD is detected in operation 242, information about the detected candidate FOD is generated and displayed in FOD field 316 of fifth panel 310 of first GUI 300. For example, in FIG. 3D, a candidate FOD 318 is displayed in field 316 with a FOD ID 190828/01 together with its location, size, color and location relative to the start of the inspection sweep. In some embodiments, the location of a candidate FOD can also be displayed on airport diagram 314 of first GUI 300 (not shown).

Figure 4B:
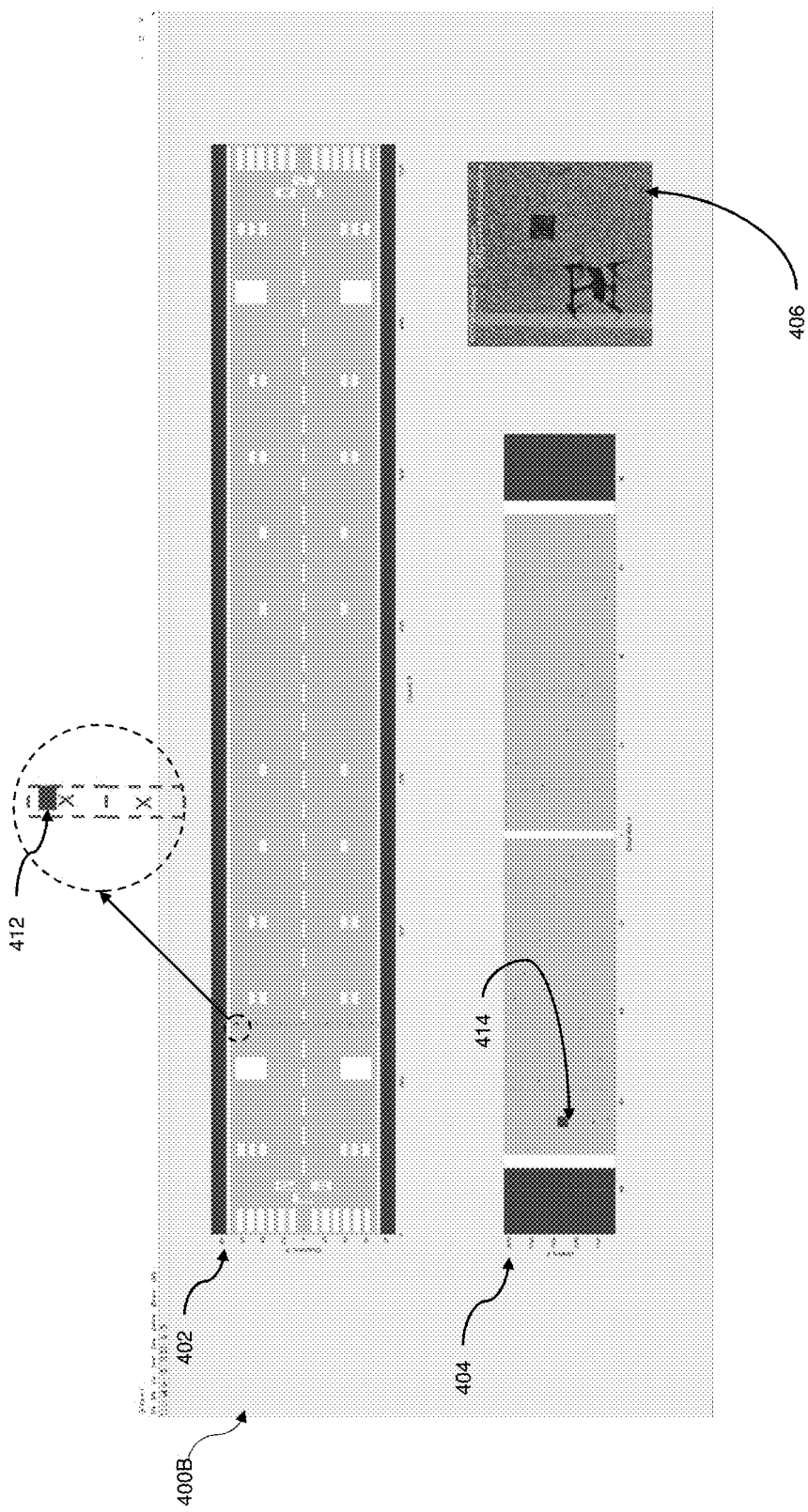
FIG. 4B is a screen shot of the second GUI showing detection of a candidate FOD in accordance with one embodiment of the invention.

FIG. 4B illustrates an example where candidate FOD information is displayed in second GUI 400 in accordance with one embodiment of the invention. Further in the present example, when candidate FOD is detected in operation 242, second GUI 400 is updated to include the location of the candidate FOD and the candidate FOD image generated in operation 242. In FIG. 4B, the location of the candidate FOD is displayed as a red square 412 in upper plot 402 and as a red square 414 in lower plot 404, and the candidate FOD image generated in operation 242 is displayed to the right of lower plot 404 in display area 406 together with information specifying the location of the candidate FOD, for example, as latitude-longitude coordinates or relative to the start of the sweep. From operation 250, processing continues to decision operation 252.

In decision operation 252, a determination is made whether the sweep has completed as earlier described with reference to decision operation 246. When the sweep is not complete ("NO"), processing continues and returns to operation 240. Alternatively, when the sweep has completed ("YES"), processing ends. At the end of the inspection sweep, the user can then send a team to inspect and/or remove the candidate FOD. In some embodiments, the results of the inspection sweep, such a list of the candidate FOD populated in FOD field 316 can be automatically sent to a ground team to allow the ground team to further inspect and/or remove the candidate FOD.

Optionally, a user could conduct further inspection of a candidate FOD by sending one or more UAVs 114 out of formation to conduct further inspection of the candidate FOD before sending a team to inspect and/or remove the candidate FOD. When a user input of a return to candidate FOD selection entered in fourth panel 308 is received together with a selected candidate FOD, method 104 obtains and displays updated data for the candidate FOD. For example, method 104 sends a command to a UAV 114 to transit to the location of the selected candidate FOD and provide further live images 126, which are displayed to the user, for example in display area 406 of second GUI 400 or in a separate window. Following this option processing can end, allowing the user to then send a ground team to inspect and/or remove the candidate FOD. In some embodiments, when a ground team inspects a candidate FOD location and concludes that there is no FOD, but rather a new asphalt crack or tire mark added to the runway surface, the ground team can send the information back to system 100, enabling a user to replace the corresponding image in library 120 with a new reference FOD-free image to avoid repetitive false detection in future inspections of the runway. In various embodiments, a ground team can be composed of persons, unmanned ground vehicles, and/or UAVs, that can inspect, verify, and/or remove candidate FOD.

Figure 2D:
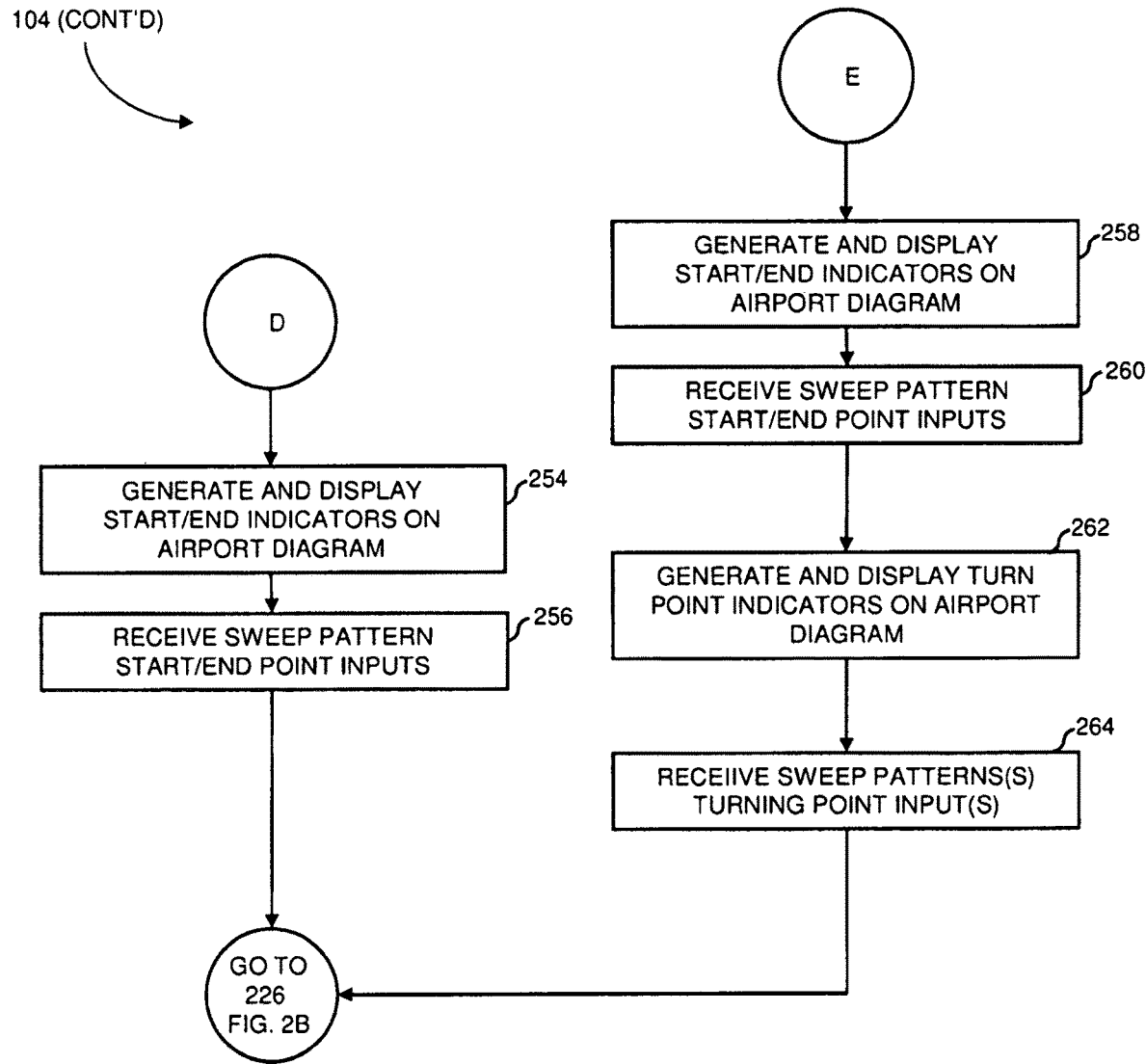

Referring now back to FIG. 2B and operation 222, when, instead of a full sweep pattern input, an input of a partial sweep pattern in received in operation 222, processing continues to operation 236 with a partial sweep pattern process initiated and processing continuing to operation 254 (FIG. 2D).

Referring now to FIG. 2D, in operation 254, method 104 generates and displays a start point indicator and an end point indicator on the airport diagram displayed in panel 314 of sixth panel 312 of first GUI 300 (FIG. 3A), such as a start cross-hair indicator and a stop cross-hair indicator (not shown).

In operation 256, input of the partial sweep pattern start point and end point are received. For example, the user manipulates the start point indicator and the end point indicator on the airport diagram and inputs the selection of the start point indicator and inputs the selection of the end point indicator, for example, by double-clicking on the selected start point indicator and end point indicator. On receipt, processing continues to operation 226 (FIG. 2B), with processing continuing as earlier described.

Referring again back to FIG. 2B and operation 222, when, instead of a full sweep pattern input or a partial sweep pattern input, an input of a curved sweep pattern is received in operation 222, processing continues to operation 238 with a curved sweep pattern process initiated and processing continuing to operation 258 (FIG. 2D).

Referring now to FIG. 2D, in operation 258, method 104 generates and displays the start point indicator and end point indicator on the airport diagram displayed in panel 314 of sixth panel 312 of first GUI 300 (FIG. 3A), such as a start cross-hair indicator and a stop cross-hair indicator (not shown).

In operation 260, input of the curved sweep pattern start point and end point are received. For example, the user manipulates the start point indicator and end point indicator on the airport diagram and inputs the selection of the start point indicator and inputs the selection of the end point indicator, for example, by double-clicking on the selected start point indicator and end point indicator. On receipt, processing continues to operation 262.

In operation 262, method 104 generates and displays turn point indicators on the airport diagram displayed in panel 314 of sixth panel 312 of first GUI 300 (FIG. 3A), such as a turn point cross-hair indicators (not shown).

In operation 264, input of the curved sweep pattern turn point(s) are received. For example, the user manipulates one or more turn point indicators on the airport diagram and inputs the selection of the turn point indicator(s), for example, by double-clicking on the selected turn point indicator(s). On receipt, processing continues to operation 226 (FIG. 2B), with processing continuing as earlier described.

In various embodiments of method 104, the selections of "Reset Distance Scanned" and "Return to Candidate FOD" in fourth panel 308 can be implemented as interrupt processes to method 104. Those of skill in the art can understand that the various functionalities of method 104 can be computer coded in a variety of ways, and that the present embodiment is not meant to be limiting.

Figure 6:
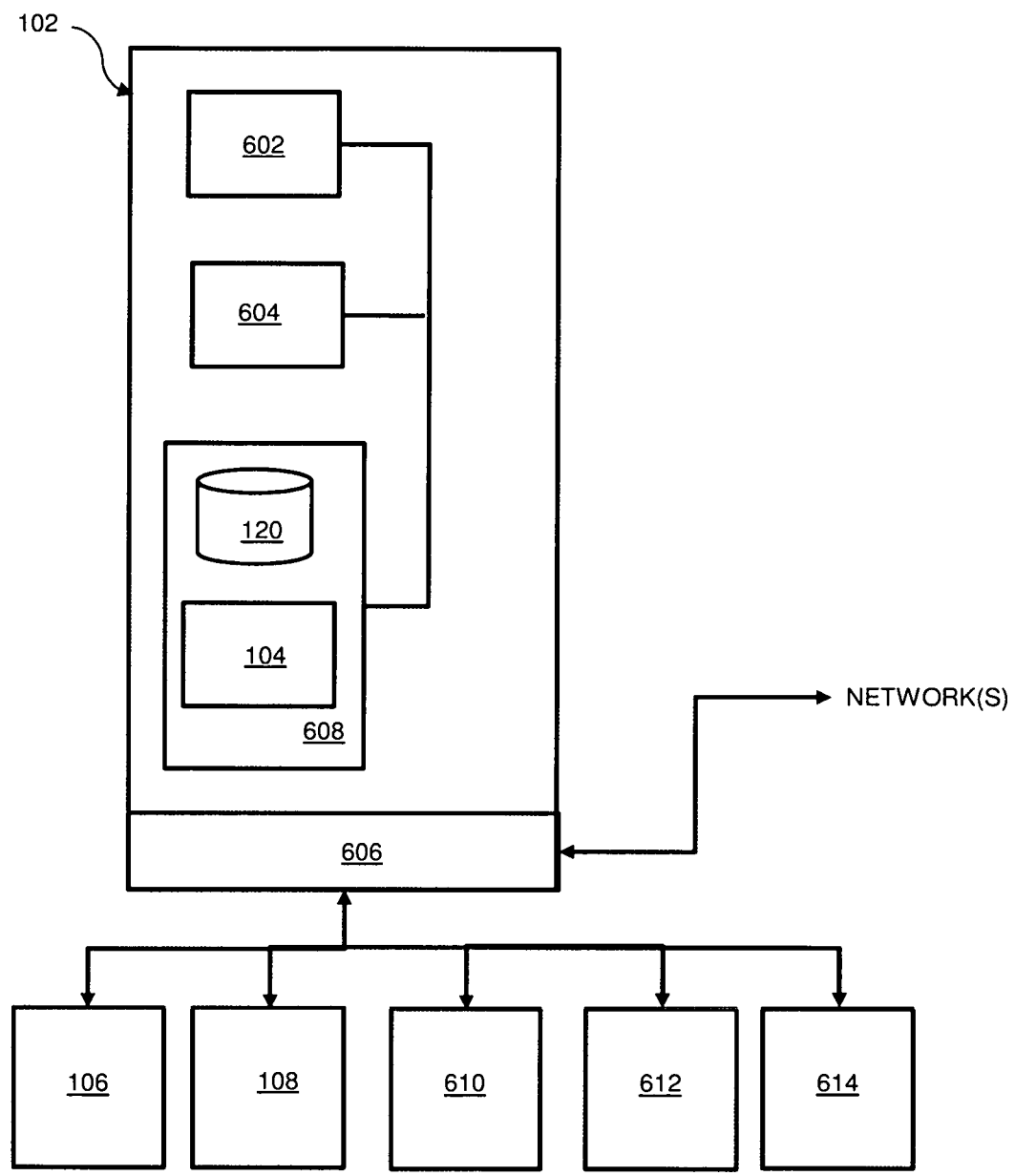
FIG. 6 is a schematic illustration of a computer system on which the methods of the invention can be executed in accordance with one embodiment of the invention.

FIG. 6 is a schematic illustration of an example computer system 102 in accordance with one embodiment of the invention. Referring now to FIGS. 1 and 6 together, in one embodiment, computer system 102 includes: a central processing unit (CPU) 602; an operating system 604; one or more input/output (I/O) interface(s) 606; and a memory 608, including UAV-based FOD detection method 104 and FOD-free reference image library 120 containing a plurality of FOD-free reference images 128 (not shown). In various embodiments, I/O interfaces (s) 606 may include device interfaces, as well as network interfaces, that allow computer system 102 to communicate with network 112, UAVs 114, external systems, such as system 122, and users, such as user 110.

Computer system 102 may further include standard devices such as display device 106, input device 108, e.g., a keyboard, a mouse 610, and a printer 612, as well as one or more standard input-output (I/O) devices 614, such as a compact disk (CD) or DVD drive, or other porting device for inputting data to and outputting data from computer system 102. In one embodiment, method 104 is loaded into computer system 102 as executable code via I/O device 614, such as from a CD, DVD, or other digital communicable form containing method 104, or via a network download. Library 120 can also be loaded into computer system 102 as a separate library, or be included with method 104. In some embodiments, library 120 can be fully or partially stored on an external system accessible by method 104.

In the present embodiment, method 104 is stored in memory 608 and executed on computer system 102. In some embodiments, computer system 102 may be further coupled to a larger network (not shown), such as a larger airport monitoring network. In some embodiments, method 104 can be fully or partially implemented on an external network. In one embodiment, method 104 can be embodied as a computer program product in a medium configured to store or transport computer readable code. Some examples of computer program products are CD-ROM discs, DVDs, ROM cards, and computer hard drives.

As described herein, embodiments in accordance with the invention allow a user to automatically conduct an aerial sweep a selected runway surface for FOD using UAVs equipped with EO sensors. Live images of the runway surface captured by the EO sensors and received from the UAVs are compared with corresponding FOD-free reference images of the runway surface to determine whether candidate FOD are detected on the runway surface. Information and images of candidate FOD are displayed to the user allowing the user to determine whether to send a team to remove the FOD from the runway.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A system for unmanned aerial vehicle (UAV)-based foreign object debris (FOD) detection comprising:
   a computer system, the computer system comprising:
   a user input device,
   a display screen,
   a UAV-based foreign object debris (FOD) detection method executable by the computer system, and
   a foreign object debris (FOD)-free reference image library accessible by the UAV-based FOD detection method, the FOD-free reference image library further comprising a plurality of FOD-free reference images of a runway surface;
   a plurality of unmanned aerial vehicles (UAVs), each UAV having an electro-optical (EO) sensor configured to obtain live images of the surface of the runway, each UAV configured to conduct an aerial inspection sweep of the runway surface in accordance with information received from the UAV-based FOD detection method; and
   a wireless network communicatively coupling the UAV-based FOD detection method with the plurality of UAVs,
   wherein the UAV-based FOD detection method displays one or more graphical user interfaces to a user on the display screen allowing the user to input selections which define a UAV-based aerial inspection sweep of a selected runway surface for FOD by the plurality of UAVs;
   further wherein the UAV-based FOD detection method receives live images of the runway surface captured by each of the EO sensors of the plurality of UAVs during the UAV-based aerial inspection sweep of the runway surface and compares the live images to corresponding FOD-free reference images of the runway surface obtained from the FOD-free reference image library and determines if candidate FOP is detected on the runway surface based on the comparison, and
   further wherein when candidate FOD is detected, the UAV-based FOD detection method displays one or more graphical user interfaces to the user identifying the candidate FOD.

2. The system of claim 1 wherein upon initiation of the UAV-based FOD detection method by a user, UAV-based FOD detection method generates and displays a first GUI on the display screen, the first GUI allowing a user to input selections defining the UAV-based aerial inspection sweep of the runway.

3. The system of claim 2 wherein upon start of the aerial inspection sweep of the runway by the plurality of UAVs, UAV-based FOD detection method generates and displays a second GUI on the display screen, the second GUI showing progress of the UAV-based aerial inspection sweep.

4. The system of claim 3 wherein upon detection of candidate FOD during the UAV-based aerial inspection sweep of the runway, the UAV-based FOD detection method generates and displays information identifying the candidate FOD on the first GUI and the second GUI.

5. The system of claim 1 further comprising;
   one or more external systems accessible via the network, each of the one or more external systems providing information for use by the UAV-based FOD detection method.

6. The system of claim 1 wherein the user can restart the aerial inspection sweep of the runway.

7. The system of claim 1 wherein the user can initiate a further inspection of a candidate FOD by one or more of the plurality of UAVs.

8. The system of claim 1 wherein upon completion of the UAV-based aerial inspection sweep of the runway a listing of candidate FOD with identifying information and location is automatically provided to one or more users.

9. The system of claim 1 wherein upon completion of the UAV-based aerial inspection sweep of the runway, a listing of candidate FOD with identifying information and location is automatically provided to a ground team for removal of the candidate FOD.

10. A method for unmanned aerial vehicle (UAV)-based foreign object debris (FOD) detection comprising:
    generating a first graphical user input (GUI) displayed to a user, the first GUI allowing the user to input selections defining a UAV-based aerial inspection sweep of a runway surface for FOD;
    receiving the user input(s) defining the UAV-based aerial inspection sweep;
    receiving a user input to initiate the UAV-based aerial inspection sweep;
    transmitting information to a plurality of UAVs to transit to a start point of the inspection sweep on the runway, each of the UAVs having electro-optical (EO) sensors for capturing live images of the runway surface during the inspection sweep;
    initiating the inspection sweep of the runway surface for FOD with the plurality of UAVs aerially transiting the surface runway and transmitting the live images of the runway surface during the inspection sweep;
    generating a second GUI displayed to the user, the second GUT displaying to the user representations of the progress of the inspection sweep on the runway;
    receiving the live images of the runway surface captured by the EO sensors of the plurality of UAVs;
    comparing each of the live images to corresponding FOD-free reference images of the runway surface obtained from a FOD-free reference image library, the FOD-free reference image library further comprising a plurality of FOD-free reference images of the runway surface;
    determining whether candidate FOD are detected in the live images based on the comparison with the FOD-free reference images; and
    when a candidate FOD is detected, updating the first GUI with information identifying the candidate FOD, and updating the second. GUI with information identifying the candidate FOD.

11. The method claim 10 wherein the aerial inspection sweep pattern is selected based on a user input from the group consisting of a full sweep pattern, a partial sweep pattern, and a curved sweep pattern.

12. The method of claim 10 further comprising:
    receiving a user input to reset the distance scanned which repeats the selected UAV-based aerial inspection sweep;
    transmitting information to a plurality of UAVs to return transit to the start point of the aerial inspection sweep on the runway;
    initiating the inspection sweep of the runway surface for FOD with the plurality of UAVs aerially transiting the surface runway and transmitting the live images of the runway surface during the inspection sweep;
    generating a second GUI displayed to the user, the second GUI displaying to the user representations of the progress of the inspection sweep on the runway;

receiving the live images of the runway surface captured by the EO sensors of the plurality of UAVs;

comparing each of the live images to corresponding FOD-free reference images of the runway surface obtained from a FOD-free reference image library, the FOD-free reference image library further comprising a plurality of FOD-free reference images of the runway surface;

determining whether candidate. FOD are detected in the live images based on the comparison with the FOD-free reference images; and when a candidate FOD is detected, updating the first GUI with information identifying the candidate FOD, and updating the second GUI with information identifying the candidate FOD.

13. The method of claim 10 further comprising:

receiving a user input to return to candidate FOD and a selected candidate FOD identifier;

transmitting information to one or more UAVs in the plurality of UAVs to transit from the remaining plurality of UAVs and to transit to the location of the selected candidate FOD and provide further live images of the candidate FOD on the runway surface;

receiving the further live images of the candidate FOD on the runway surface; and displaying the further live images of the candidate FOD on the runway surface to the user.

14. The method of claim 10, wherein the first GUI includes:

a first panel configured to display fields comprising:
 a date of an aerial inspection,
 an airport,
 an airport runway,
 a length of the airport runway;
a width of the airport runway, a max of the plurality of UAVs, and
 a user selected speed of the plurality of UAVs to transit the runway;
a second panel configured to display fields comprising:
 a model of an EO sensor,
 an EO sensor resolution,
 a user selected altitude above ground level (AGL) at which the plurality of UAVs are to transit the runway;
 a field of view of the EO sensor;
 a number of UAVs needed to transit the runway and conduct the aerial inspection widthwise;
 a ground foot print of each of the plurality of UAVs;
 a number of images per UAV; and
 a minimum object size of detectable FOD;
a third panel configured to display fields comprising:
 a user selected sweep pattern for the aerial inspection;
 an inspection distance; and
 a duration of the aerial inspection;
a fourth panel configured to display fields, comprising:
 a sweep start/stop input selection,
 an inspection progress indicator, and
 a distance scanned field;
a fifth panel configured to display fields comprising:
 a FOD field for display of information identifying each candidate FOD detected during the aerial inspection; and
a sixth panel comprising:
 an airfield panel for display of a user selected airport having a runways selected for the aerial inspection; and
 one or more fields indicating wind direction and speed at the selected airport.

15. The method of claim 14, wherein the second GUI comprises:

an upper panel configured to display in real time elements comprising:
 a representation of the selected runway surface together with the location of candidate FOD detected during the aerial inspection;
 a representation of the location of the plurality of UAVs during the aerial inspection; and
 a representation of a ground footprint of each of the plurality of UAVs;
a lower panel configured to display in real time elements comprising:
 a representation of the selected runway surface within they ground footprint of the plurality of UAVs together with the location of candidate FOD detected during the aerial inspection, and
 a display area for display of images of candidate FOD detected during the aerial inspection.

* * * * *